(12) United States Patent
Wu et al.

(10) Patent No.: US 7,454,143 B1
(45) Date of Patent: Nov. 18, 2008

(54) RECONFIGURABLE THIN FILM BASED DWDM DEVICES FOR RECONFIGURABLE ADD-DROP OPTICAL SYSTEMS

(75) Inventors: Xuehua Wu, Union City, CA (US); Mingjun Zhao, Fremont, CA (US); John Feng, Union City, CA (US); Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 572 days.

(21) Appl. No.: 10/736,818

(22) Filed: Dec. 15, 2003

(51) Int. Cl.
*H04J 14/02* (2006.01)

(52) U.S. Cl. .................................................... 398/85
(58) Field of Classification Search .................. 398/85, 398/83; 359/589
See application file for complete search history.

(56) References Cited

U.S. PATENT DOCUMENTS

| | | | | | |
|---|---|---|---|---|---|
| 3,700,791 | A | * | 10/1972 | Bosomworth | 358/485 |
| 5,333,090 | A | * | 7/1994 | Baumeister et al. | 359/584 |
| 5,506,053 | A | * | 4/1996 | Hubbard | 428/402 |
| 5,742,712 | A | * | 4/1998 | Pan et al. | 385/18 |
| 6,292,299 | B1 | * | 9/2001 | Liou | 359/583 |
| 6,320,996 | B1 | * | 11/2001 | Scobey et al. | 385/18 |
| 6,707,960 | B2 | * | 3/2004 | Li et al. | 385/18 |

OTHER PUBLICATIONS

25. Lecture, Nov. 30, 1999. University of Rochester, p. 1-8.*

* cited by examiner

*Primary Examiner*—Shi K Li
(74) *Attorney, Agent, or Firm*—Patterson & Sheridan L.L.P.

(57) ABSTRACT

A reconfigurable thin film based dense wavelength division multiplexing (DWDM) device is described for hitless switching of wavelengths by employing a reconfigurable filtering device. The reconfigurable filtering device is based on a mechanical switching of a filtering chip which has a thin film coated a first one-half of a first face for interference wavelength filtering and has a gold-mirror coated on a second one-half of the first face for high reflection.

19 Claims, 16 Drawing Sheets

40

RECONFIGURABLE THIN FILM BASED DWDM DEVICES FOR RECONFIGURABLE ADD-DROP OPTICAL SYSTEMS

BACKGROUND INFORMATION

1. Field of the Invention

The invention relates generally to the field of optics, and more particularly to optical add-drop multiplexers.

2. Description of Related Art

Reconfigurable optical add-drop multiplexers (ROADM) have become increasingly popular due to the emergence of dynamic networks. A service provider seeks the flexibility to add or drop any wavelength at any client site/node, which stimulates the development in the areas of tunable filters (TF), tunable laser sources (TLS) and reconfigurable blocking filters (RBF). Current solutions tend to be expensive while yielding mediocre performance. The optical industry remains years away from attaining an optimal design and manufacture solution that provides full reconfigurability at a low cost for next generation of optical networks.

In the interim, semi-reconfigurability solutions that are relatively inexpensive provide attractive alternatives when network carriers desire to contain costs. Two conventional designs of wavelength channel switching are commonly adopted. In a first approach, a transmissive structure employs a wavelength demultiplexer (demux), a wavelength multiplexer (mux), and an array of 2×2 fiber optical switches for directing a light beam to a desired path. However, the use of multiple discreet subcomponents renders this approach impractical since it causes a high-insertion loss as well as the high cost of using multiple discreet subcomponents.

In a second approach, the filtering and switching functions are integrated on a single device. An example of the integrated functions is a thin film based 2×2 add-drop fiber optical switch. One shortcoming of this device structure is that it does not produce a hitless feature, which is a desirable function for reconfigurability. The term "hitless" in this context means that there is no interruption or negligible interruption in the passage of express or non-drop channels when another channel is transitioning from drop to non-drop or non-drop or drop.

Accordingly, it is desirable to have a reconfigurable optical device that has a hitless switch capability.

SUMMARY OF THE INVENTION

The present invention describes a reconfigurable thin film based dense wavelength division multiplexing (DWDM) device for hitless switching of wavelengths by employing a reconfigurable filtering device. The reconfigurable filtering device is based on a mechanical switching of a filtering chip which has a thin film coated on a first one-half on a first face for interference wavelength filtering and has a gold-mirror coated on a second one-half of the first face for high reflection.

A reconfigurable thin film filter (TFF) based dense wavelength division multiplexing (DWDM) device, comprises a dual fiber collimator having an input port for receiving an input optical signal and a reflection output port; a single fiber collimator having a transmission output port; and a thin film filter located between the dual fiber collimator and the single fiber collimator, the thin film filter having a first face and a second face, the first face of the thin film filter having an upper one-half and a lower one-half, the lower one-half of the first face in the thin film filter being coated with a reflective material.

In addition, the reconfigurable thin film based DWDM device can be cascaded for designing a reconfigurable add-drop fiber optical system that is capable of either dropping or expressly passing selected wavelengths.

Advantageously, the present invention is polarization insensitive. It produces an insertion loss that is comparable to a conventional thin film filter device. Moreover, the present invention advantageously provides a practical low-cost reconfigurable solution.

Other structures and methods are disclosed in the detailed description below. This summary does not purport to define the invention. The invention is defined by the claims.

DETAILED DESCRIPTION OF PREFERRED EMBODIMENTS

Figure 1:
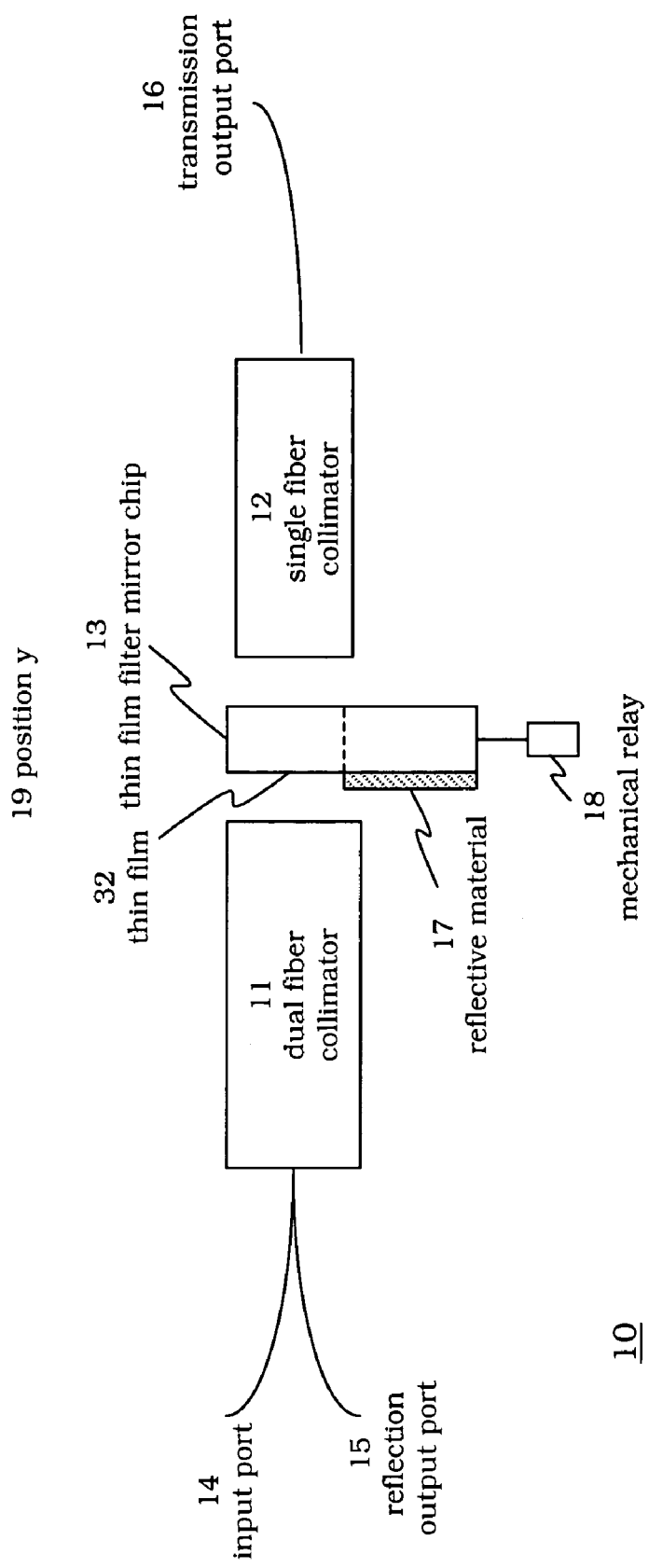
FIG. 1 is a structural diagram illustrating a first embodiment of a reconfigurable thin film filter based dense wavelength division multiplexing device in a pass-through state position in accordance with the present invention.

Referring now to FIG. 1, there is shown a structural diagram illustrating a reconfigurable thin film filter based dense wavelength division multiplexing device (TFF DWDM) 10 in a pass-through state position. The TFF DWDM device 10 comprises a dual fiber (two-fiber) collimator 11, a single fiber (one-fiber) collimator 12, and a thin film filter mirror (TFFM) chip 13. The dual fiber collimator 11, which is well-known in the art, has a dual fiber tip with a graded index (GRIN) lens (not separately shown) so that a first fiber in the dual fiber collimator 11 functions as an input port 14 for receiving an input optical signal and a second fiber in the dual fiber collimator 11 functions as a reflection output port 15. The single fiber collimator 12 has a single fiber tip with a GRIN lens (not separately shown) for correcting a transmission output port 16 through a transmission window of the TFFM chip 13. The TFFM chip 13 has a first face and a second face in which the first face has an upper one-half and a lower one-half. The surface area of the upper one-half in the first face of the TFFM chip 13 is coated with a thin film 32 for transmission of a specific wavelength while the lower one-half in the first face of the TFFM chip 13 is coated with a reflective material 17, such as gold, for reflecting all light back through the dual fiber collimator 11 to the reflection output port 15. One of ordinary skill in the art should recognize that the upper one-half and the lower one-half in the first face of the TFFM chip 13 is intended as an illustration. Other ratios of dividing the upper section and the lower section in the first face of the TFFM chip 13 can be practiced without departing from the spirit of the present invention. It is also apparent to one of skill in the art that the upper one-half in the first face of the TFFM chip 13 could be coated with a reflective material, while the lower one-half in the first face of the TFFM chip 13 could be thin film coated.

In the pass-through position (FIG. 1), the mechanical relay 18 positions the upper one-half in the first face of the TFFM chip 13 at a position y 19 so that an incoming light beam passes through the dual collimator 11, through the TFFM chip 13, through the single fiber collimator 12 and to the transmission output port 16. The upper one-half in the first face of the TFFM chip 13 is coated with a thin film 32 so that the incoming light beam passes through to the transmission output port 16. When the apparatus 10 receives an incoming optical signal comprising one or more wavelengths that are not intended to be dropped, the mechanical relay 18 moves the TFFM chip 13 in the position y 19 (FIG. 1) such that the one or more wavelengths may pass through expressly.

Figure 2:
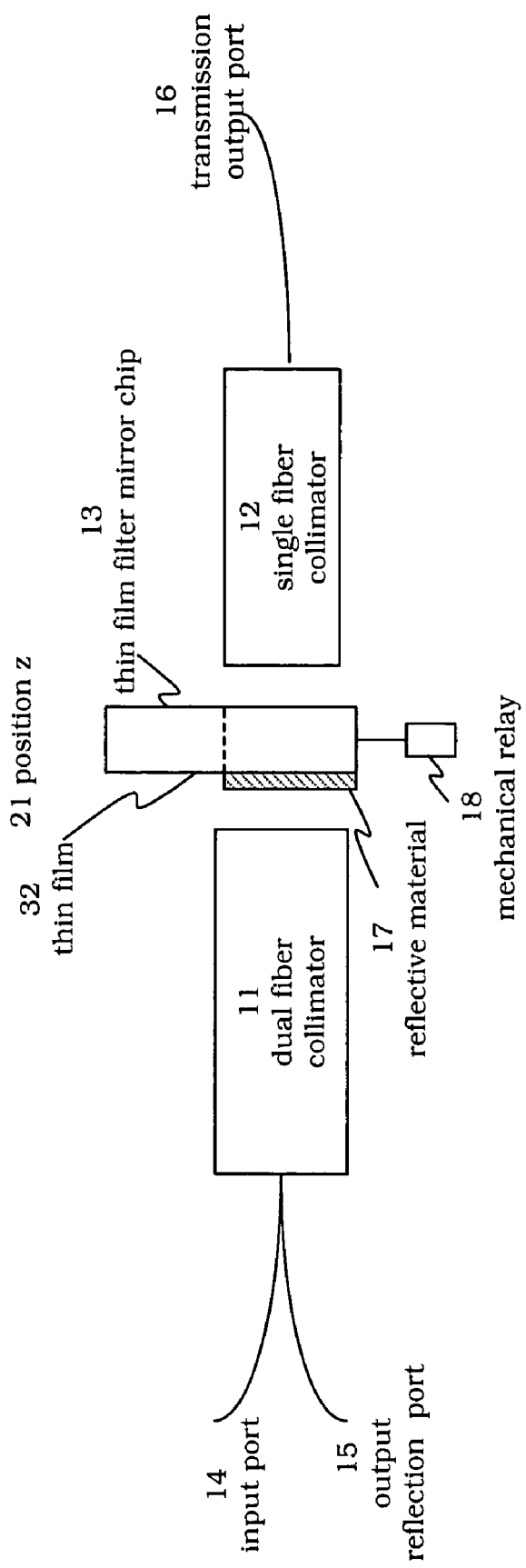
FIG. 2 is a structural diagram illustrating the first embodiment of a reconfigurable thin film filter based dense wavelength division multiplexing device in a blocking state position in accordance with the present invention.

As shown in FIG. 2, there is a structural diagram illustrating a reconfigurable thin film filter based dense wavelength division multiplexing device in a blocking state position. The mechanical relay 18 moves the TFFM chip 13 to a position z 21 such that an incoming light beam travels through the input port 14, propagates through the dual collimator 11, projects onto the reflective material 17 of the TFFM chip 13, and reflects from the surface of the reflective material 15 back through the dual fiber collimator 11 and to the reflection output port 15.

The process of making the TFFM chip 13 is to coat one-half in a first face of a thin film filter (TFF) with thin film that allows transmission of a specific channel wavelength, followed by the placement of the TFFM chip 13 into a chamber for gold coating the other one-half in the first face of the thin film filter. Preferably, the thickness of the gold coating should be the same as the wavelength of the specific channel, which is designed for transmission for the TFF. This is significant to produce a hitless switching feature in the TFF DWDM device 10, which is affected by the chosen thickness of the gold coating in the TFFM chip 13.

In the switch structure, the position of the TFFM chip 13 is operated by the mechanical relay 18. The mechanical relay 18 is controlled by, for example, a circuit board (not shown) or alternatively by manual operation. The free space optical alignment for each component can be done simply for a TFF device. The mechanical relay 18 has two main positions: at position y 19 (FIG. 1), the mechanical relay 18 moves the TFFM chip 13 to where the input light passes through the thin film 32 of the TFFM chip 13 and exits through the single fiber collimator 12 to the single fiber output port transmission 16; at position z 21 (FIG. 2), the mechanical relay 18 moves the TFFM 13 to where the input light is reflected by the reflective material (e.g. gold mirror) 17 and is reflected back through the dual fiber collimator 11 to the reflection output port 15. The switching time is typically in the milliseconds range.

Figure 3:
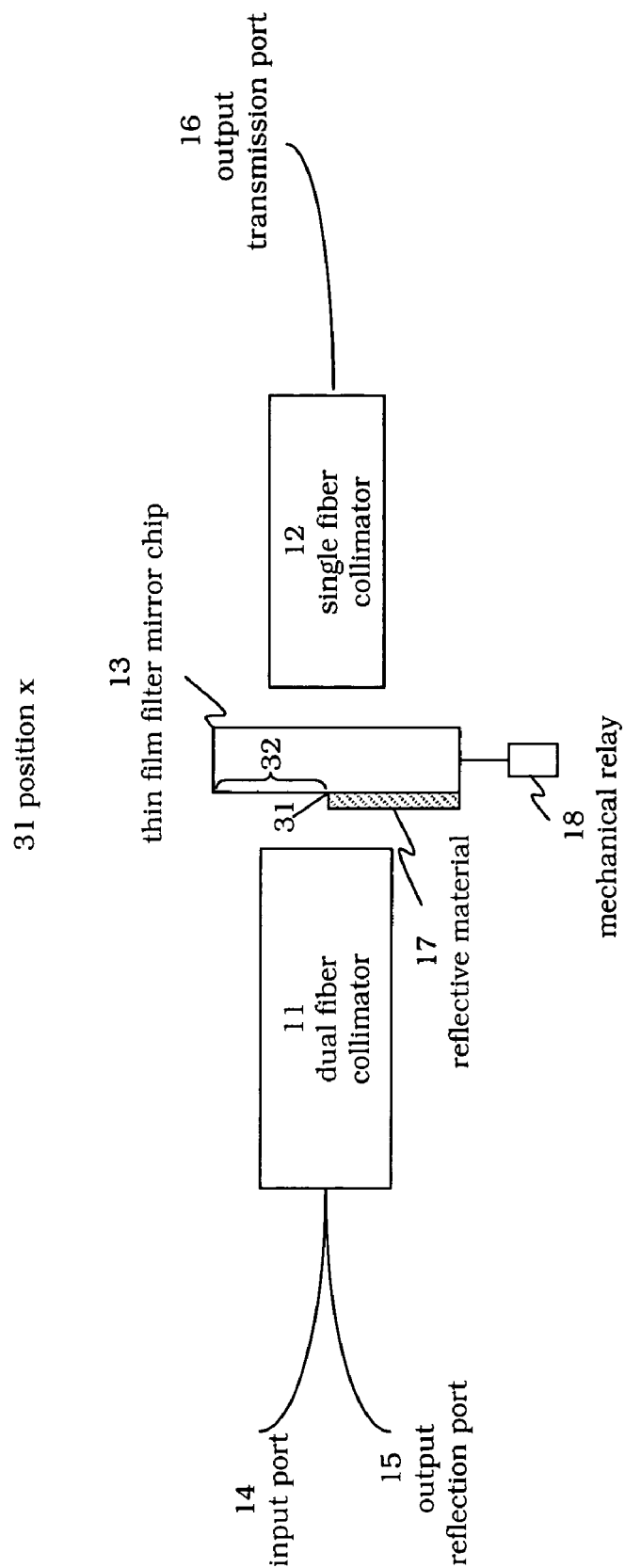
FIG. 3 is a structural diagram illustrating the first embodiment of a reconfigurable thin film filter based dense wavelength division multiplexing device in a transient state position in accordance with the present invention.
Figure 4:
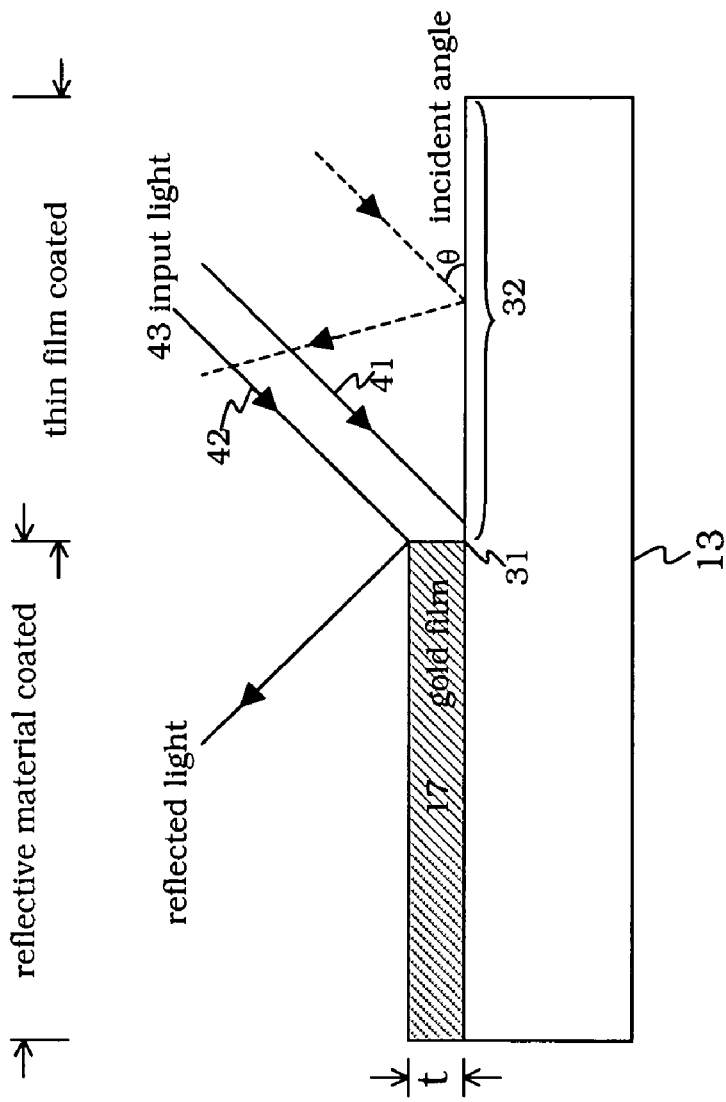
FIG. 4 is a structural diagram illustrating a cross-junction in the first embodiment of the reconfigurable thin film filter based dense wavelength division multiplexing device in the transient state position in accordance with the present invention.

The TFF DWDM device 10 operates between these two states, a pass-through state (FIG. 1) or a blocking state (FIG. 2). A third state is possible, though not desirable, when the TFFM chip 13 is in a transient state position, as illustrated in FIGS. 3 and 4.

The TFFM chip 13 is in the transient state when a light beam from the input optical signal projects from the dual fiber collimator 11 onto the TFFM chip 13 such that a portion of the light beam hits the area coated with the thin film 32 while the other portion of the light beam hits the reflective material 17. As shown in FIG. 4, an input light 43 projects a partial beam 41 and a partial beam 42 at a cross junction 31 in which the partial light 41 hits the thin film coating 32 and the partial light 42 hits the reflective coated material 17. A signal interference could occur while the TFFM 13 is in the transient position where the partial beam 42 reflected from the reflective coated material 17 and the partial beam 41 intercepting the thin film filter area 32 such that the partial beams 41 and 42 may interfere with one another.

The angle θ denotes an incident angle of light, which is typically near 90 degrees is where an input light beam is projected. When the light beam projects at the cross junction 31, the first partial input light beam 41 projects onto the upper one-half of the first face which is coated with the thin film 32, while the second partial input light beam 42 projects onto the lower one-half of the first face which is coated with a reflective material 17. The first partial light beam 41 carries a phase differential from the second partial light beam 42. There could also be interference created between the first partial light beam 41 and the second partial light beam 42. In the worst case, the interference between the first partial light beam 41 and the second partial light beam 42 may cause the first partial light beam 41 to cancel out the second partial light beam 42.

Equation 1 below shows the mathematical relationship between the thickness, t, of the reflective material 17 and the effectiveness of the hitless switching.

$$t(\sin\theta) = n\lambda \qquad \text{Eq. (1)}$$

$$\text{if } n = 0, 1, 2, \ldots \quad I = I_{max} = I_0$$

$$\text{If } n = \frac{1}{2} \qquad I = I_{min} = 0$$

The angel θ is the incident angle, as shown in FIG. 4. The parameter n dictates the thickness, t, of the reflective material 17. The parameter n is preferably selected to be an integer number for producing the maximum intensity of light, as indicated below.

If n=1, 2, 3, or any integer number, the intensity of light will be at maximum, with a constructive interference.

If n=0.5, 1.5, 2.5, etc., the intensity of light will be at minimum intensity, with a destructive interference.

When the condition of t(sin θ)=nλ (where n=0, 1, 2, or 3 . . . ) is met, the two partial beams 41 and 42 will interfere constructively with no loss, where t represents the thickness of the reflective material 17 and λ represents the wavelength. If this condition is satisfied, the reconfigurable thin film filter based dense wavelength division multiplexing device 10 will produce a hitless switching during the transition between the pass-through state and the blocking state in the transient potion (FIGS. 3 and 4).

Figure 5:
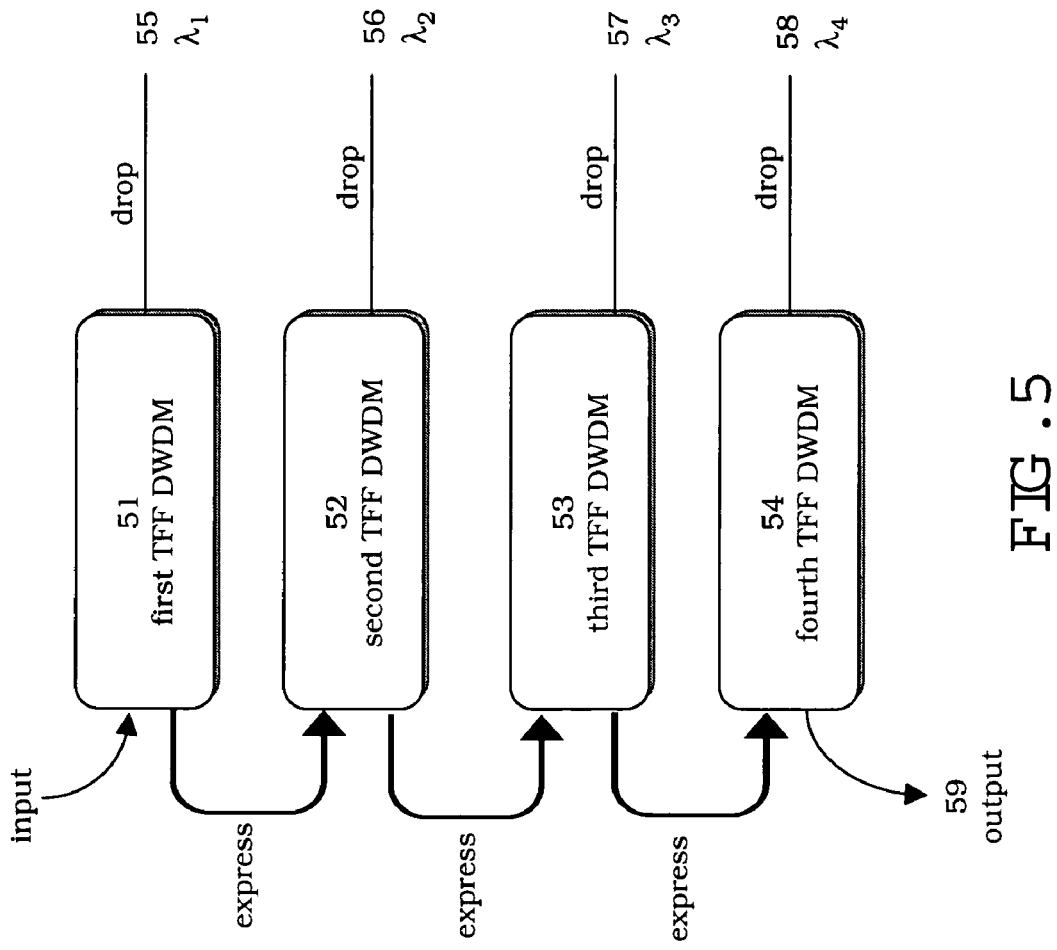
FIG. 5 is an architectural diagram illustrating a reconfigurable thin film filter based dense wavelength division multiplexing system in accordance with the present invention.

FIG. 5 is an architectural diagram illustrating a reconfigurable thin film filter based dense wavelength division multiplexing system 50 in accordance with the present invention. By cascading multiple DWDM devices together, the system 50 operates as multi-wavelength add-drop modules to achieve a flexible combination of whether to drop or express pass-through multiple wavelengths. The system 50, as shown in this embodiment, has four TFF DWDM devices 51, 52, 53, and 54. The first TFF DWDM device 51 can either drop or express pass-through the wavelength $\lambda_1$ 55. If the wavelength $\lambda_1$ 55 is express passed-through, it is directed to the second TFF DWDM 52 together with other wavelengths $\neq \lambda_1$. Secondly, the second DWDM device 52 can either drop or express pass-through the wavelength $\lambda_2$ 56. If the wavelength $\lambda_2$ 56 is express passed-through, it is directed to the third TFF DWDM 53 together with other wavelengths $\neq \lambda_2$. Thirdly, the third DWDM device 53 can either drop or express pass-through the wavelength $\lambda_3$ 57. If the wavelength $\lambda_3$ 57 is express passed-through, it is directed to the fourth TFF DWDM 54 together with other wavelengths $\neq \lambda_3$. Fourthly, the fourth DWDM device 54 can either drop or express pass-through the wavelength $\lambda_4$ 58 to an output 59. The reconfigurable thin film filter based dense wavelength division multiplexing system 50 operates with a hitless feature in that the dropping of one or more wavelengths at a particular channel does not affect the transitioning on the express channel path.

Figure 6:
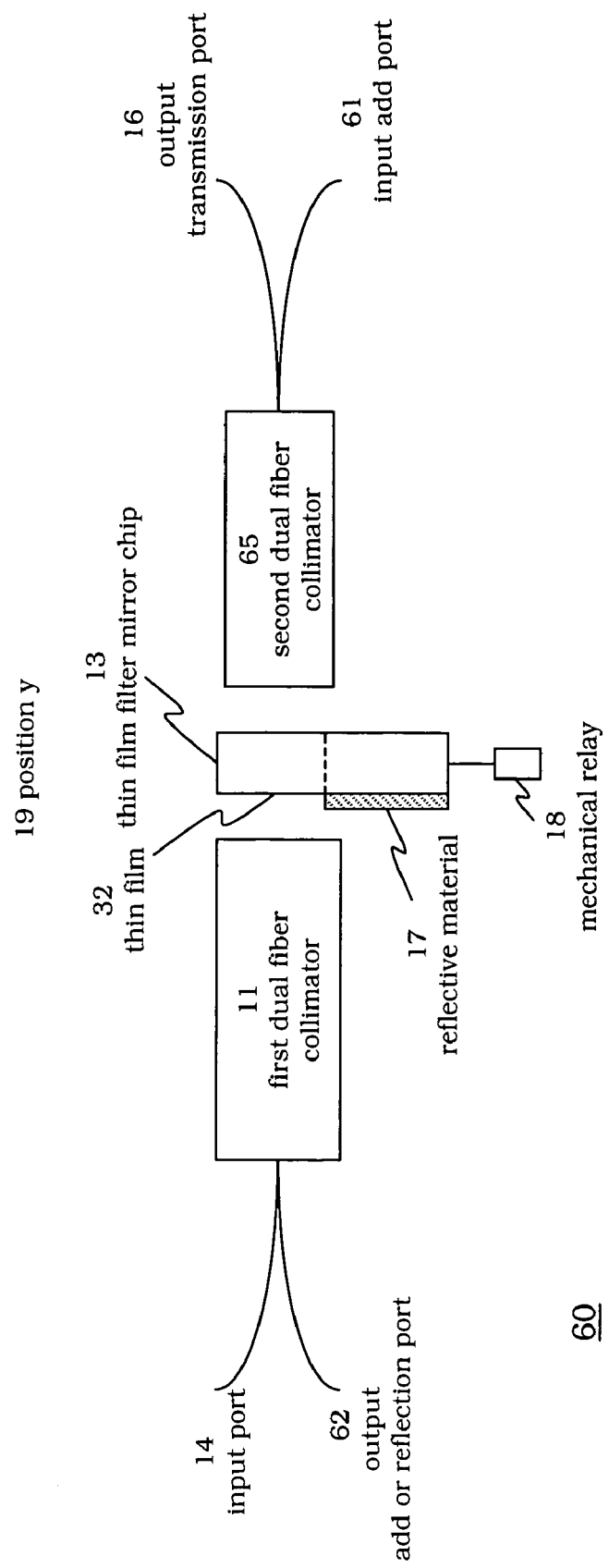
FIG. 6 is a structural diagram illustrating a second embodiment of a reconfigurable thin film filter based dense wavelength division multiplexing device in accordance with the present invention.

FIG. 6 is a structural diagram illustrating a second embodiment of a reconfigurable thin film filter based dense wavelength division multiplexing device (TFF DWDM) 60 in accordance with the present invention. The TFF DWDM device 60 provides the capability to add a channel or wavelength through an input add port 61, propagating through a second dual fiber collimator 65, the upper one-half in the first face (or the thin film 32) of the TFFM chip 13, the dual fiber collimator 11 and to an output add (or reflection port 62). Other operations of the TFF DWDM device 60 operates similar to the TFF DWDM device 10 as described in FIGS. 1, 2 and 3 with the reference to the dual fiber collimator 11 as a first dual fiber collimator 11.

Figure 7:
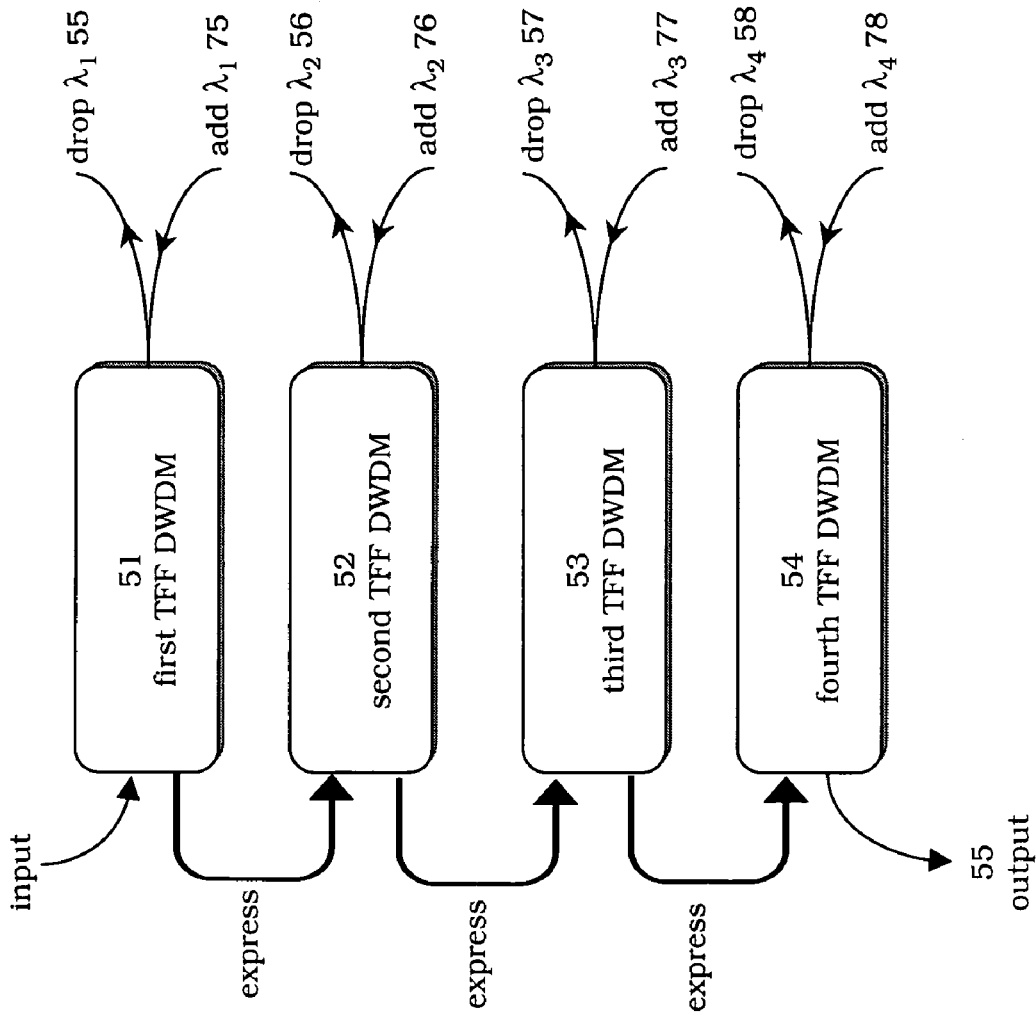
FIG. 7 is an architectural diagram illustrating an alternative embodiment of a reconfigurable thin film filter based dense wavelength division multiplexing system in accordance with the present invention.

FIG. 7 is an architectural diagram illustrating an alternative embodiment of a reconfigurable thin film filter based dense wavelength division multiplexing system 70 in accordance with the present invention. By cascading multiple DWDM devices together, the system 70 operates as multi-wavelength add-drop modules to achieve a flexible combination of whether to add, drop or express pass-through multiple wavelengths. The system 70, as shown in this embodiment, has four TFF DWDM devices 51, 52, 53, and 54. The first TFF DWDM device 51 can either drop, add or express pass-through the wavelength $\lambda_1$ 55. If the wavelength $\lambda_1$ 55 is express passed-through, it is directed to the second TFF DWDM 52 together with other wavelengths $\neq \lambda_1$. In addition, if the wavelength $\lambda_1$ 55 is dropped, the wavelength $\lambda_1$ 55 can be added back through the add port 75 for propagating through the first TFF DWDM 51 to the second TFF DWDM 52. Secondly, the second DWDM device 52 can either drop, add or express pass-through the wavelength $\lambda_2$ 56. If the wavelength $\lambda_2$ 56 is express passed-through, it is directed to the third TFF DWDM 53 together with other wavelengths $\neq \lambda_2$. In addition, if the wavelength $\lambda_2$ 56 is dropped, the wavelength $\lambda_2$ 56 can be added back through the add port 76 for propagating through the second TFF DWDM 52 to the third TFF DWDM 53. Thirdly, the third DWDM device 53 can either drop, add or express pass-through the wavelength $\lambda_3$ 57. If the wavelength $\lambda_3$ 57 is express passed-through, it is directed to the fourth TFF DWDM 54 together with other wavelengths $\neq \lambda_3$. In addition, if the wavelength $\lambda_3$ 57 is dropped, the wavelength $\lambda_3$ 57 can be added back through the add port 77 for propagating through the third TFF DWDM 53 to the fourth TFF DWDM 54. Fourthly, the fourth DWDM device 54 can either drop, add or express pass-through the wavelength $\lambda_4$ 58. In addition, if the wavelength $\lambda_4$ 58 is dropped, the wavelength $\lambda_4$ 58 can be added back through the add port 78 for propagating through the fourth TFF DWDM 54 to the output 59. The reconfigurable thin film filter based dense wavelength division multiplexing system 70 operates with a hitless feature in that the dropping of one or more wavelengths at a particular channel does not affect the transitioning on the express channel path.

Figure 8A:
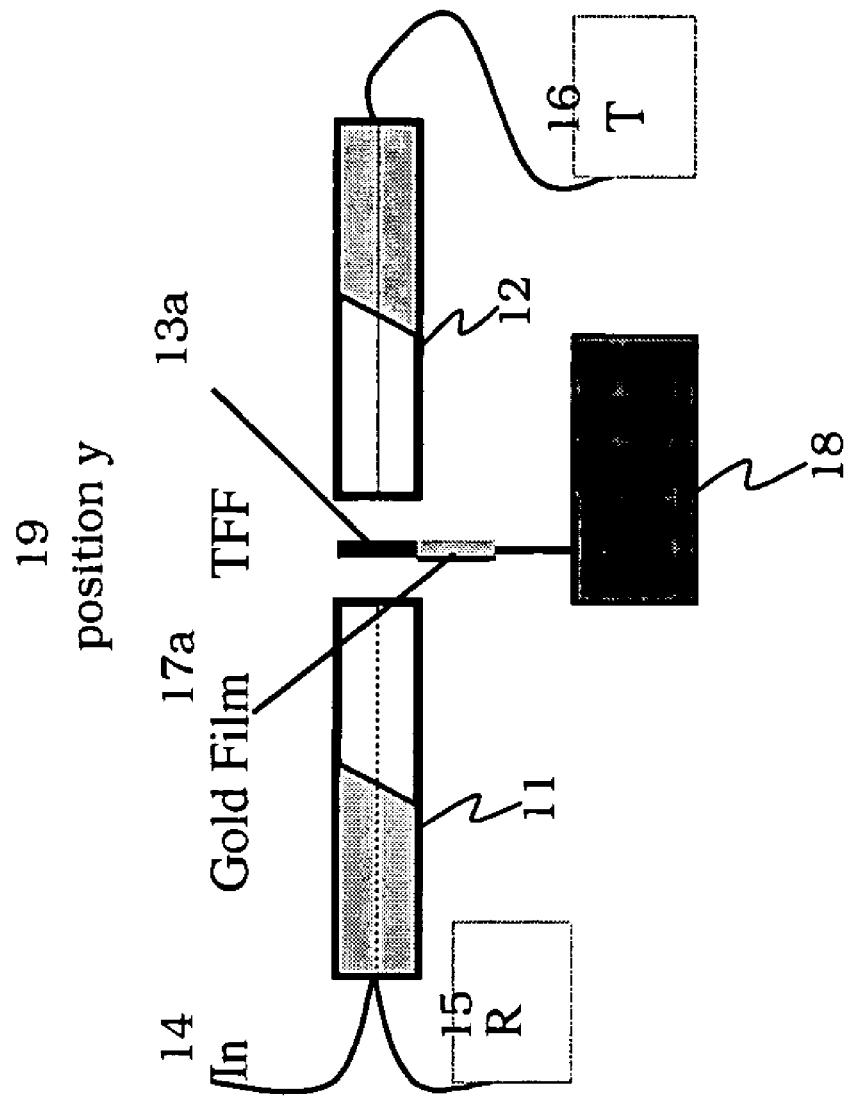
FIGS. 8A-8C are graphical diagrams illustrating an example of the reconfigurable dense wavelength division multiplexing device in the pass-through state position in accordance with the present invention.
Figure 8C:
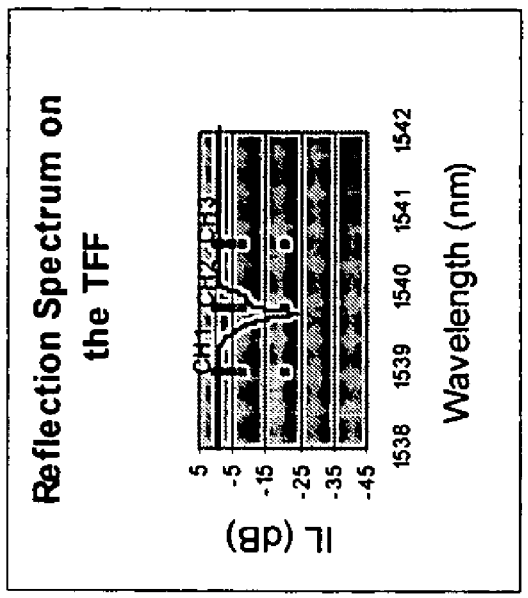
Figure 8B:
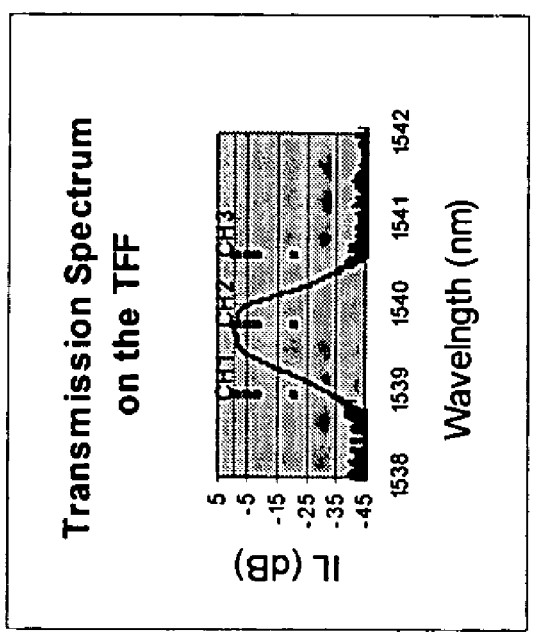

FIGS. 8A-8C are graphical diagrams illustrating an example of the reconfigurable dense wavelength division multiplexing device in the pass-through state position in accordance with the present invention. In this embodiment as shown in FIG. 8A, the thin film filter mirror chip 13 is implemented with a TFF 13a and the reflective material 17 is implemented with a gold film 17a. With the mechanical relay 18 holding the TFF 13a in the position y 19, the input optical signal comprising a plurality of wavelength channels $\lambda_1$, $\lambda_2$, ... $\lambda_n$ enters the input port 14, through the dual fiber collimator 11. The TFF 13a passes a single wavelength $\lambda_d$ through the single fiber collimator 12 to the transmission output port 16. There is no light signal of wavelength $\lambda_d$ reflected back to the reflection output port 15. Other channels having wavelengths $\neq \lambda_d$ may be reflected back to port 15. In effect, the mechanical relay moves the TFF 13a to the position y 19 where the input light of channel $\lambda_d$ propagates through a clear window of the TFF 13a and exits from the single fiber output port transmission port 16. For instance, if $\lambda_d = \lambda_1$, The graphical diagrams in FIGS. 8B and 8C show, respectively, that the wavelength $\lambda_1$ in channel 1 passes through to the transmission output port 16, and that the wavelength $\lambda2$ in channel 2 and the wavelength $\lambda_3$ in channel 3 are reflected back to the reflection output port 15.

Figure 9A:
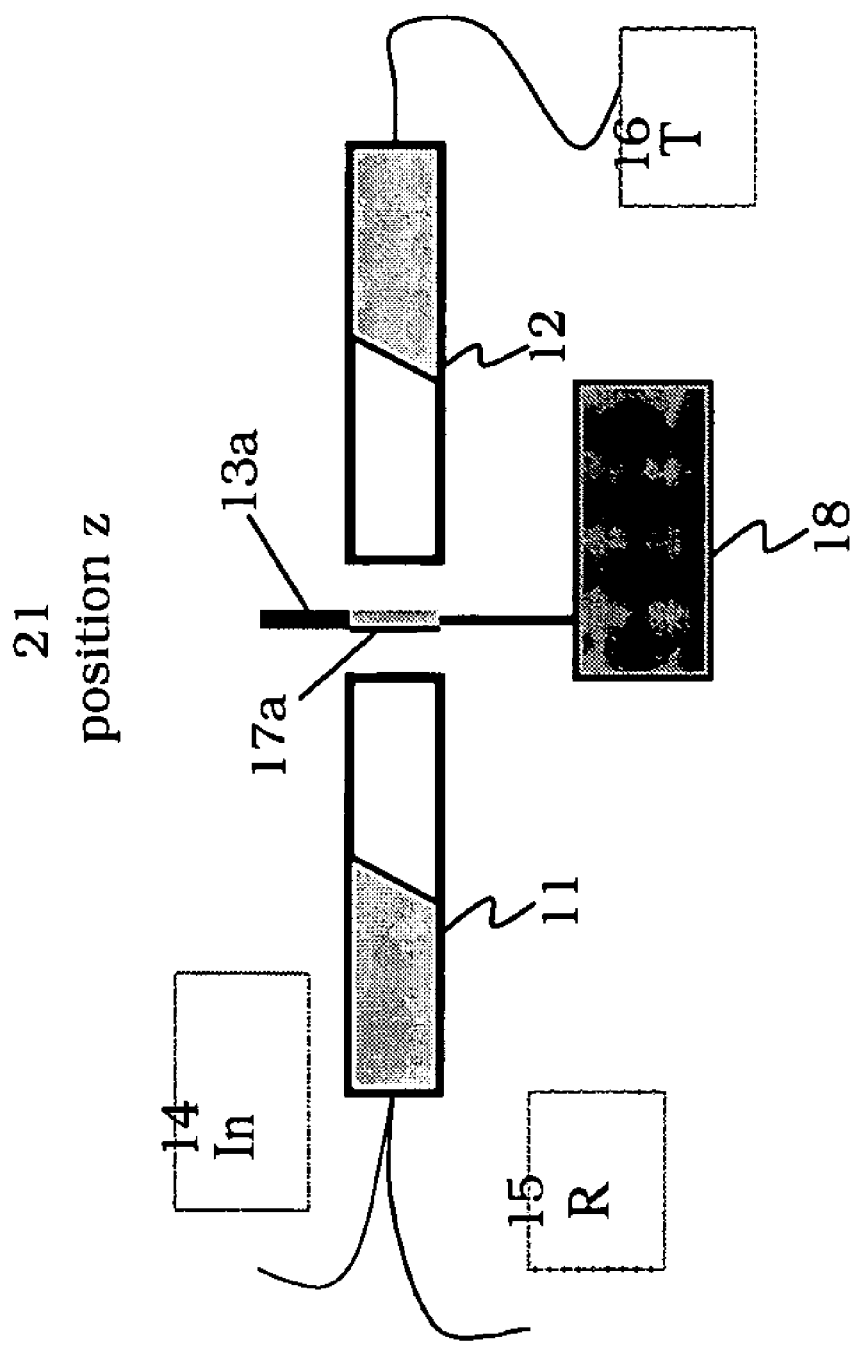
FIGS. 9A-9C are graphical diagrams illustrating an example of the reconfigurable dense wavelength division multiplexing device in the blocking state position in accordance with the present invention.
Figure 9C:
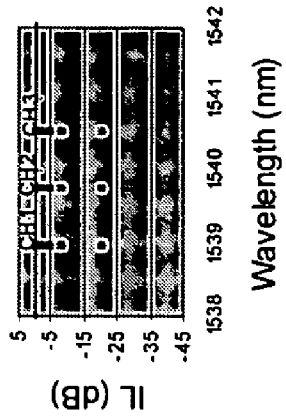
Figure 9B:
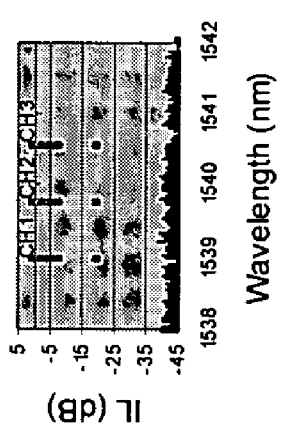

FIGS. 9A-9C are graphical diagrams illustrating an example of the reconfigurable dense wavelength division multiplexing device in the blocking state position in accordance with the present invention. With the mechanical relay 18 holding the TFF 13 in the position z 21, all of the chancels $\lambda_1, \lambda_2 \ldots \lambda_n$ comprising the input optical signal enters the input port 14, through the dual fiber collimator 11, and reflect off the gold film 17a back to the reflection output port 15. In effect, the mechanical relay moves the TFF 13 to the position z 21 where the input light is reflected by the gold film or mirror 17a to the reflection output port 15. The graphical diagram in FIG. 7B shows the waveform for the spectrum measured at port 16 where the input light is blocked such that the intensity is of the input light at the transmission output port 16 is near zero or minimum for all wavelengths. The graphical diagram in FIG. 9C shows the waveform spectrum measured at port 15 with the gold film 17a where the intensity is near 1 or maximum for $\lambda_1$ in channel 1, $\lambda_2$ in channel 2 and $\lambda_3$ in channel 3.

Figure 10A:
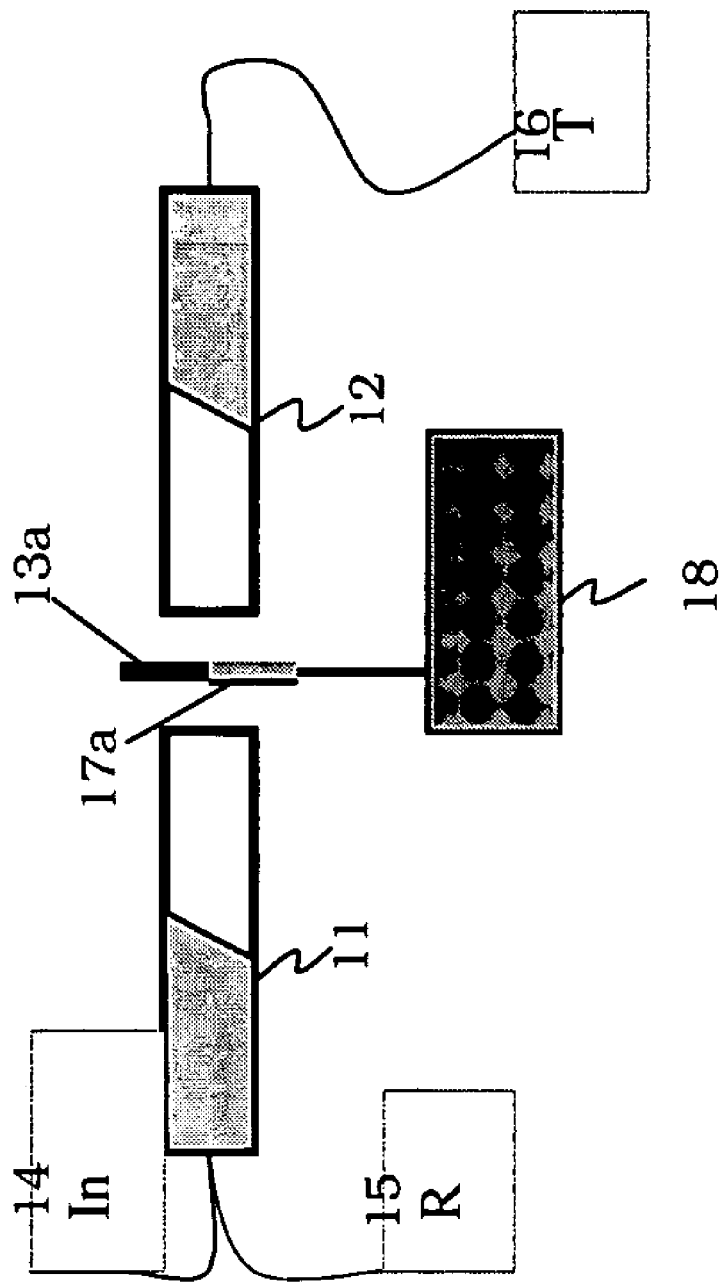
FIGS. 10A-10C are graphical diagrams illustrating an example of the reconfigurable dense wavelength division multiplexing device in the transient state position in accordance with the present invention.
Figure 10C:
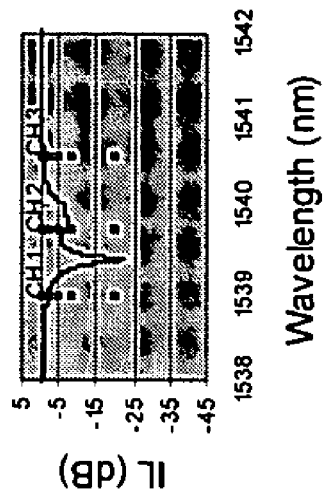
Figure 10B:
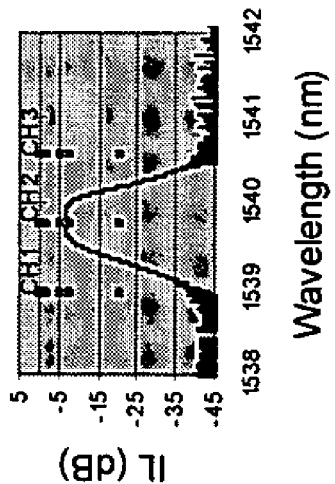

FIGS. 10A-10C are graphical diagrams illustrating an example of the reconfigurable dense wavelength division multiplexing device in the transient state position in accordance with the present invention. When the TFFM chip 13 switches from the position y 19 to the position z 21 or when the TFFM chip 13 switches from the position z 21 to the position y 19, the input beam will need to move through a cross junction between the thin film 13*a* and the gold film 17*a* such that the input beam is projected in an area which is between the clearly pass-through state position and the clearly blocking state position. While in this transient state where the mechanical relay 18 moves the TFFM chip 13 to the position x 31, it is possible that there could be a beam interruption of the light when the light hits the junction between the gold film 17*a* and the thin film filter 13*a* that may affect the intensity of the reflected beam. It is desirable that the thickness of the gold coating is equal to or approximately the same as the reflected light wavelength. The waveforms for the drop spectrum (measured at port 16) and the express spectrum (measured at port 15) in the position x 31 are shown in FIGS. 8A and 8B, respectively.

In one example, a suitable selection of the TFFM chip 13 is a 1.4×1.4 mm² four-cavity thin film interference filter. The TFF in the TFFM chip 13 has a designed center wavelength of 1546.12 nm with a 25 dB stop band of 1 nm. The TFF is coated with a 1546 nm thickness gold layer on one-half of the first face of the TFF. The input port is powered by a broadband source. A first power meter is used to monitor the signal at the transmission output port 16 and a second power monitor is used to monitor the signal at the reflection output port 15.

Figure 11A:
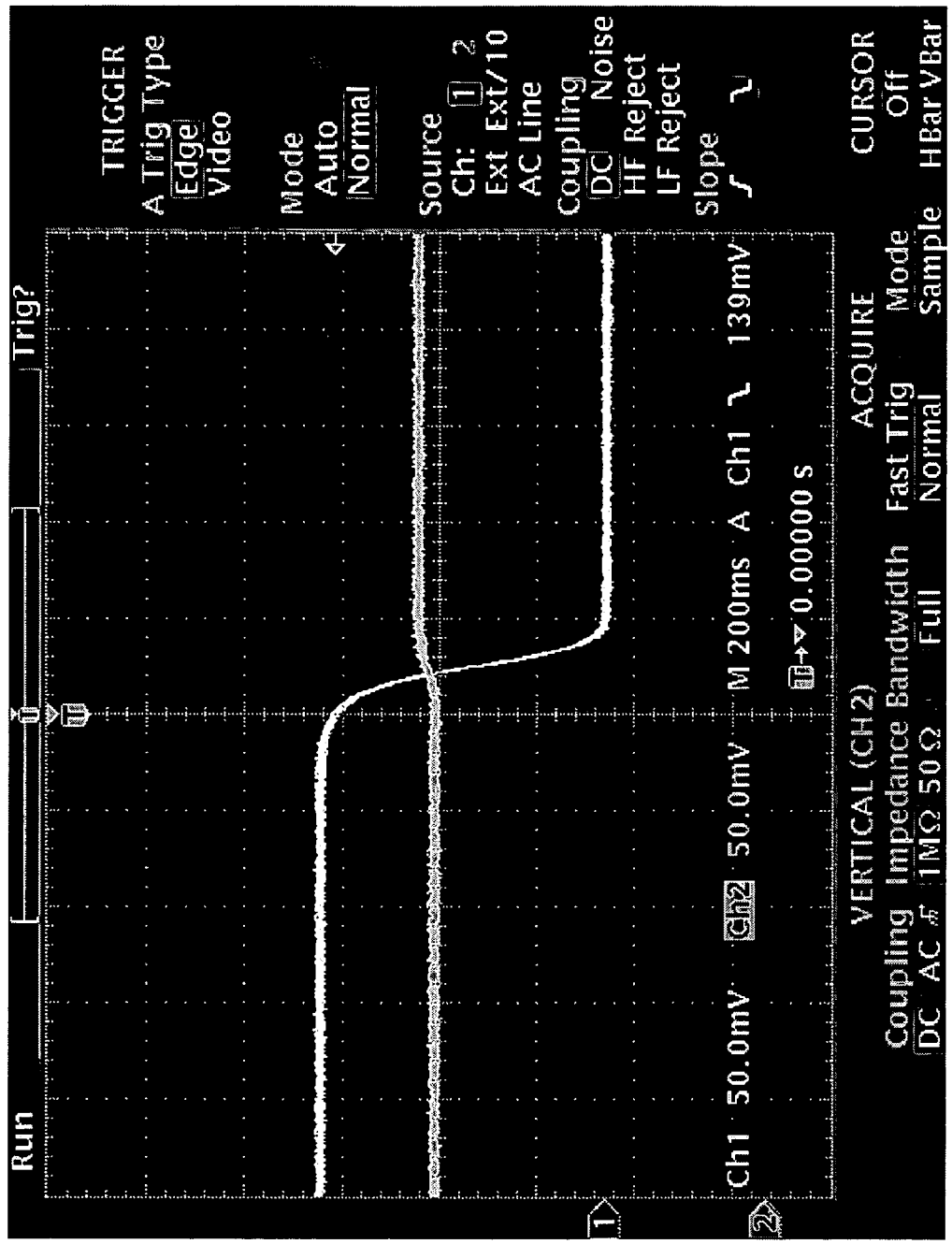
FIGS. 11A-11C are graphical diagrams illustrating experimental results on the traces of the transmitted and reflected signals in accordance with the present invention.
Figure 11B:
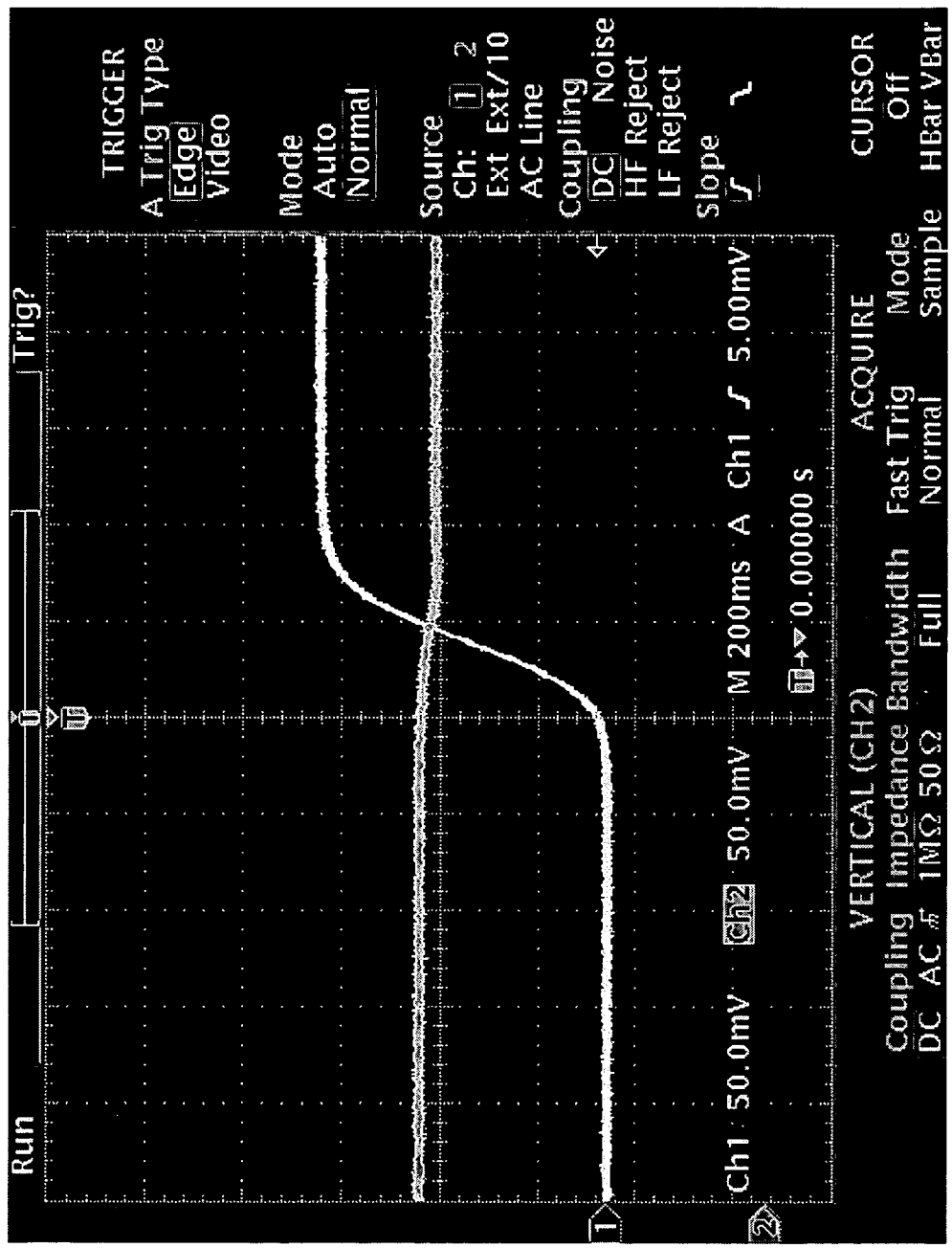
Figure 11C:
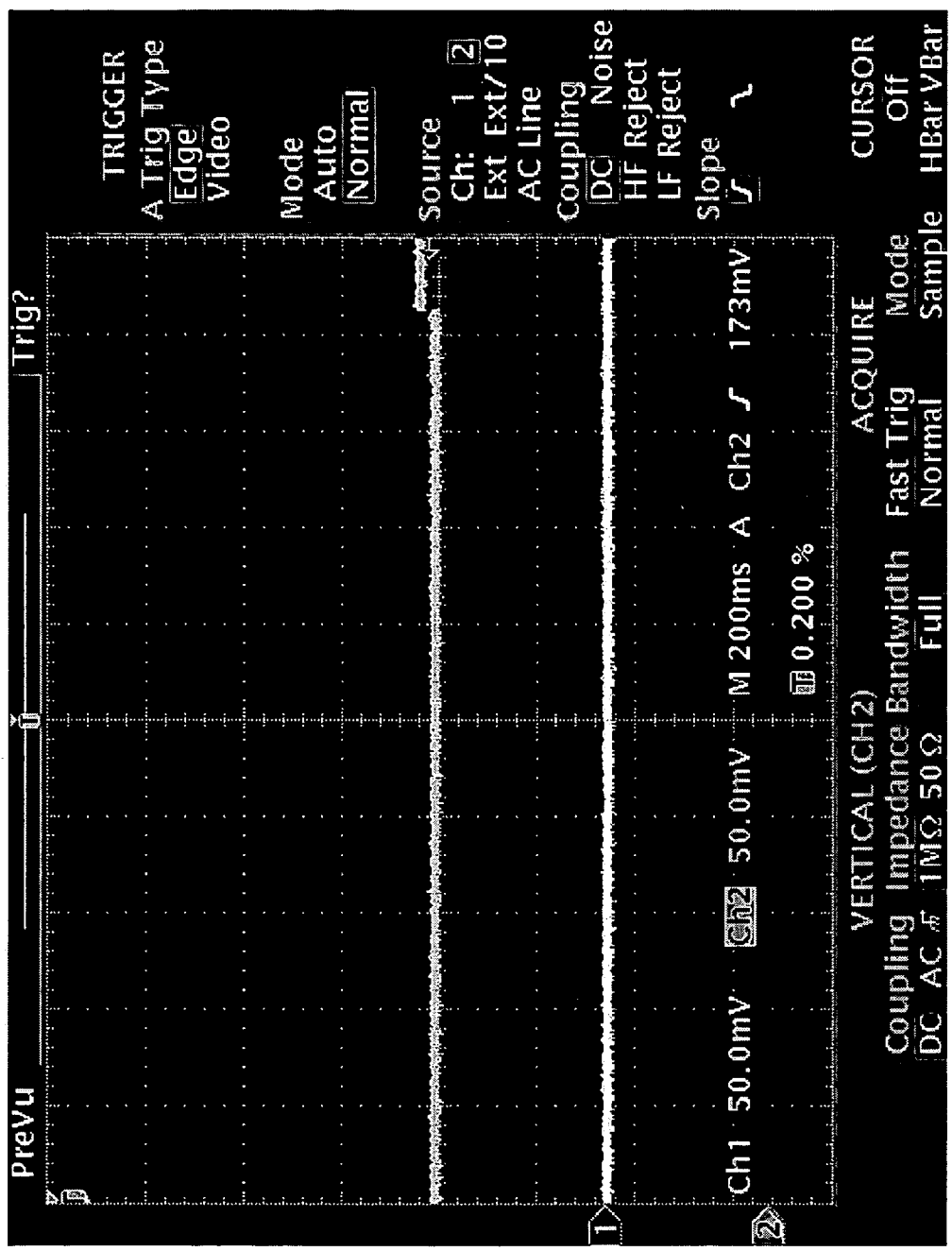

FIGS. 11A-11C are graphical diagrams illustrating experimental results on the traces of the transmitted and reflected signals in a time domain during transition in accordance with the present invention. The amount of the transmitted signal power and the reflected signal power during the transition are measured using an oscilloscope. An input light is a c-band wide range light source. FIG. 11A shows that the transmitted power disappears and the reflected power increases by δ1 while the transition from TFF to mirror occurs and vise versa. In FIG. 11B, it is shown that the transmitted power increases from zero and the reflected power decreases by δ1 while transitioning from mirror to TFF. The δ1 can be generated from, for example, the drop signal in channel 2 adds to the total express channel. To quantify the δ1 parameter, a third experimental data is taken as shown in FIG. 11C. The express power is tested at the position y 19 and there is a placement of a reflecting coated material in front of the TFF to reflect all of the light to the express channel. The parameter δ in FIG. 11C equals to the parameter δ1 in FIGS. 9A and 9B, which confirms that there is no presence of additional loss during the transition, since there is no indication of any dip in the spectra except for δ1.

One significant parameter is the insertion loss, which represents the ratio of the input optical signal power to the corresponding output optical signal power. In one example where 100 GHz channel spacing is used, when the filtering area is in the optical path, the measured insertion loss on the transmission is approximately 0.87 dB. The 0.5 dB passband width is 0.53 nm with 0.11 dB ripple over the passband. The polarization dependent loss is 0.09 dB. The isolation to the adjacent channel is 29 dB. On the reflection output port 15, the insertion loss for an express channel is approximately 0.23 dB with a loss variation of 0.12 dB. The isolation is 16.9 dB and the polarization dependent loss is 0.06 dB. It is noted that the spectra both for transmission and reflection and the values of the key optical parameters are the same or similar from the TFF devices itself. When the mirror area is in the optical path, the insertion loss over the whole wavelength range is approximately 0.23 dB with a loss variation of 0.11 dB. The polarization dependent loss is 0.03 dB.

The above embodiments are only illustrative of the principles of this invention and are not intended to limit the invention to the particular embodiments described. For example, one of ordinary skill in the art should recognize that other reflective materials can be used, such as a metal or an oxide, without departing from the spirit of the present invention. Accordingly, various modifications, adaptations, and combinations of various features of the described embodiments can be practiced without departing from the scope of the invention as set forth in the appended claims.

We claim:

1. A reconfigurable thin-film-based dense wavelength division multiplexing (DWDM) device, comprising:
    a dual fiber collimator having an input port for receiving an input optical signal and a reflection output port;
    a single fiber collimator having a transmission output port; and
    a thin film filter located between the dual fiber collimator and the single fiber collimator, the thin film filter having a first face and a second face, the first face of the thin film filter having an upper one-half and a lower one-half, the upper one-half of the first face of the thin film having a thin film coating that allows a specific wavelength of the input optical signal to pass through and the lower one-half of the first face in the thin film filter being coated with a reflective material that reflects the input optical signal, wherein the reflective coating has a thickness that is an integer multiple of the specific wavelength of the input optical signal, divided by sin(θ), wherein the angle θ is equal to an incident angle between the input optical signal and the thin film filter, and wherein the thin film filter is movable between a pass-through state, a transient state and a blocking state along a single axis, whereby in the transient state a portion of the optical signal projects on the thin film coating and another portion of the optical signal projects on the reflective material.

2. The DWDM device of claim 1, wherein the thin film filter has a first position such that the specific wavelength of the input optical signal travels through the dual fiber collimator, the upper one-half of the first face in the thin film filter, and the single collimator in generating an output optical signal at the transmission output port.

3. The DWDM device of claim 2, wherein the thin film filter has a second position such that the input optical signal travels through the dual fiber collimator, projects into the lower one-half of the first face in the thin film filter having the reflective material, thereby the input optical signal is reflected back through the dual fiber collimator to the reflection output port.

4. The DWDM device of claim 3, further comprising a mechanical relay for moving the thin film filter to the second position.

5. The DWDM device of claim 2, further comprising a mechanical relay for moving the thin film filter to the first position.

6. The DWDM device of claim 1, wherein the reflective material of the lower one-half in the first face of the thin film filter comprises gold.

7. The DWDM device of claim 1, wherein the reflective material of the lower one-half in the first face of the thin film filter is coated with a metal or an oxide.

8. The DWDM device of claim 1, the integer multiple is selected for producing a maximum intensity of light at a cross junction between the upper one-half and the lower one-half such that there is constructive interference between the portion of the optical signal that projects on the thin film coating and the portion of the optical signal that projects on the reflective material.

9. A reconfigurable device, comprising:
an input port for receiving a light signal; and
a thin film filter having a first face and a second face, the first face of the thin film filter having an upper surface area and a lower surface area, wherein the upper surface area is thin film coated for passing through a wavelength of the light signal and the lower surface area is coated with a reflective material for blocking and reflecting the light signal, wherein the coating of the reflective material has a thickness t that allows for hitless switching as the thin film filter moves between a pass-through state and a blocking state, wherein the thickness t is equal to a parameter n times a specific wavelength $\lambda$ of the light signal, divided by $\sin(\theta)$, wherein the angle $\theta$ is equal to an incident angle between the light signal and the thin film filter, and wherein the parameter n is an integer.

10. The reconfigurable device of claim 9, further comprising a dual fiber collimator coupled between the input port and the thin film filter, the dual fiber collimator coupled to the input port for receiving the light signal and having a reflection port for receiving the reflected light signal.

11. The reconfigurable device of claim 10, further comprising a single fiber collimator for receiving the wavelength of light signal from the thin film filter and transmitting the light signal to a transmission output port.

12. The reconfigurable device of claim 9, wherein the reflective material of the lower surface area in the first face of the thin film filter comprises gold.

13. The reconfigurable device of claim 9, wherein the reflective material of the lower surface area in the first face of the thin film filter comprises an oxide.

14. The reconfigurable device of claim 9, further comprising a mechanical relay for moving the thin film filter to a first position for passing through the wavelength of light signal through the upper surface area in the first face of the thin film filter.

15. The reconfigurable device of claim 9, further comprising a mechanical relay for moving the thin film filter to a second position such that the light signal is reflected back from the lower surface area of the first face in the thin film filter.

16. A hitless thin film filter; comprising:
a thin film filter having a first face and a second face, the first face having an upper surface and a lower surface; and
a reflective material coated onto the lower surface of the first face in the thin film filter, wherein the reflective material has a thickness t in which the thickness t affects the intensity of a light beam I that is projected from a cross junction of the thin film filter, the cross junction of the thin film filter being located between the upper surface and the lower surface, wherein the thickness t is selected so that the intensity of the light beam I that is projected from the cross junction of the thin film filter is at a maximum and wherein the thin film filter is movable between a pass-through state, a transient state and a blocking state along a single axis such that the light beam projects on the upper surface and on the lower surface when the thin film filter is in the transient state, wherein the thickness t is governed by the following equation: $t(\sin \theta) = n\lambda$, wherein the angel $\theta$ denotes the incident angle of light, the symbol $\lambda$ denotes a particular wavelength and the symbol n denotes an integer.

17. A reconfigurable add-drop optical system, comprising:
a first thin film filter chip having a first face and a second face, wherein the first face of the first thin film filter chip is partially coated with a thin film to transmit a specific wavelength of a light signal and is partially coated with a reflective material to a thickness t that allows the specific wavelength of the light signal to undergo hitless switching as a portion of a light beam projects on the thin film and another portion of the light beam projects on the reflective material, wherein the thickness $t = n\lambda/(\sin \theta)$ and wherein n=an integer, $\lambda$=a specific wavelength, and the angle $\theta$=the angle $\theta$ is an incident angle between the light signal and the first face having the thin film; and
a second thin film chip, coupled to the first thin film chip, having a first face and a second face, wherein the first face of the second thin film filter chip is partially coated with a thin film and partially coated with a reflective material.

18. The reconfigurable add-drop optical system of claim 17, further comprising a third thin film chip, coupled to the second thin film chip, having a first face and a second face, wherein the first face of the third thin film filter chip is partially coated with a thin film and partially coated with a reflective material.

19. The reconfigurable add-drop optical system of claim 17, further comprising:
a dual fiber collimator coupled to the first thin film chip, the dual fiber collimator having an input port and a reflection output port; and
a single fiber collimator coupled to the first thin film chip, the single fiber collimator having a transmission output port.

* * * * *